United States Patent [19]
Conaway et al.

[11] Patent Number: 5,190,156
[45] Date of Patent: Mar. 2, 1993

[54] STORAGE BIN SYSTEM

[75] Inventors: Brian J. Conaway, Wooster; Tyrone M. Keyes, Cincinnati, both of Ohio

[73] Assignee: Rubbermaid Incorporated, Wooster, Ohio

[21] Appl. No.: 817,285

[22] Filed: Jan. 6, 1992

[51] Int. Cl.⁵ .............................................. B65D 21/00
[52] U.S. Cl. .................................... 206/509; 206/511
[58] Field of Search ................. 220/23.83; 206/509, 206/511, 512

[56] References Cited

U.S. PATENT DOCUMENTS

| | | | |
|---|---|---|---|
| 2,733,112 | 1/1956 | Dunham | 206/509 X |
| 3,361,293 | 1/1968 | Box | 206/511 |
| 3,680,735 | 8/1972 | Lucas | 206/511 |
| 4,372,444 | 2/1983 | LeGrand | 206/509 X |
| 4,760,921 | 8/1988 | Licari | 206/509 X |

OTHER PUBLICATIONS

Frem Corporation, 60 Webster Place, Worcester, Mass. 01603-0004, 1 page advertisement, date unknown.
Tucker Housewares, 2 page brochure, data unknown.
Tasket Folding Basket, 1 page advertisement, date unknown.
Dial Industries, Inc. 1538 Esperanza St., Los Angeles, Calif. 90023, 13 page brochure, date unknown.
Rubbermaid Incorporated, Wooster, Ohio 44691, 1 page advertisement, 1984.
Rubbermain Incorporated, Wooster, Ohio 44691, 6 page catalog, 1984.

Primary Examiner—Steven M. Pollard
Attorney, Agent, or Firm—Renner, Kenner, Greive, Bobak, Taylor & Weber

[57] ABSTRACT

A storage bin system (10) includes a plurality of storage bins (11) which can be stacked upon each other or nested within each other. Each bin (11) includes a bottom surface (12) with opposed side walls (13, 14) and a rear wall (15) extending upwardly therefrom to form an upper rim (18). For stacking purposes, sockets (31, 32, 33) are formed near the top of the side walls (13, 14) and the rear wall (15) to be engaged by foot members (22, 23, 24) formed near the bottom of side walls (13, 14) and the rear wall (15). Each bin (11) has a generally open front defined by a short wall (16) having an upper lip (17) thereon. The foot members (22, 23, 24) are configured so as to readily receive caster assemblies (26) should it be desired to render the bin system (10) mobile. For nesting purposes, the side walls (13, 14) are provided with ribs (41) which, when the bins (11) are nested, rest on the upper rim (18) of the bin (11) below while at the same time the bottom surface (12) of the bin (11) above rests on the lip (17) of the bin (11) below.

21 Claims, 4 Drawing Sheets

STORAGE BIN SYSTEM

TECHNICAL FIELD

The present invention relates to storage bins or containers. More particularly, the present invention relates to a system of storage containers which may be used independently to store items for the facile transportation thereof or may be stacked for the storage of items in an array of multiple containers. Specifically, the storage system of stacked containers may also optionally be provided with wheels to render the storage bins readily mobile.

BACKGROUND ART

Storage bins of the type which are stackable to form a storage bin system are known in the art. For example, in one type of system one bin above merely rests on a bin below without any positive interconnection between the bins of the stack. As such, not only is there a stability problem, but also if the user wishes to carry the stack of bins, he must inconveniently do so by grasping the bottom bin because if he engages the top bin, it will merely be removed from the stack.

In an attempt to eliminate these problems, one known stacking bin system includes bins having a rib on the bottom with apertures therein and a rim on the top with similar apertures therein. By aligning the bottom apertures of one bin with the top apertures of another bin, and by installing pop rivets through the aligned apertures, the two bins may be interconnected. The deficiencies of this system are that the extra small pop rivets are required which are not only quite susceptible to being lost, but also they could tend to wear and become ineffective after multiple uses.

Some of the aforementioned storage bin systems have been rendered mobile by the application of wheels to the bottom bin of the stack. In instances where the wheels might be permanently attached to the bin, this of course requires that the particular bin with the wheels is the only one usable as the bottom bin of a system. In some systems the bins are provided with additional feet which may receive casters therein, but such additional feet add to the expense of the product and in addition often prohibit the economically advantageous nesting of the bins as is desirable for shipping, retail display, and consumer storage.

Thus, the need exists for a storage bin system which is readily and securely stackable, as well as optionally nestable, and for one which can be conveniently rendered mobile to form a cart system.

DISCLOSURE OF THE INVENTION

It is thus a primary object of the present invention to provide a storage bin which is readily stackable with like bins to present a storage bin system.

It is another object of the present invention to provide a storage bin, as above, which is easily interconnected to the like bins to form the storage bin system.

It is a further object of the present invention to provide a storage bin, as above, which can be interconnected to the like bins without the need of additional fasteners.

It is an additional object of the present invention to provide a storage bin, as above, which is formed so as to optionally receive wheels therein so as to be rendered mobile without the need for additional parts.

It is yet another object of the present invention to provide a storage bin, as above, which is nestable with the like bins for economically and conveniently shipping, displaying or storing of the bins.

These and other objects of the present invention, as well as the advantages thereof over existing prior art forms, which will become apparent from the description to follow, are accomplished by the improvements hereinafter described and claimed.

In general, a storage bin according to the present invention includes a bottom surface having opposed side walls and a rear wall extending upwardly therefrom to form an open top. Foot members are formed near the bottom of the side walls and rear wall, and sockets are formed near the top of the side walls and the rear wall. Means are provided in the foot members so that they may engage the sockets of a like bin in the event that it is desired to form a system of stacked bins.

A preferred exemplary storage bin incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
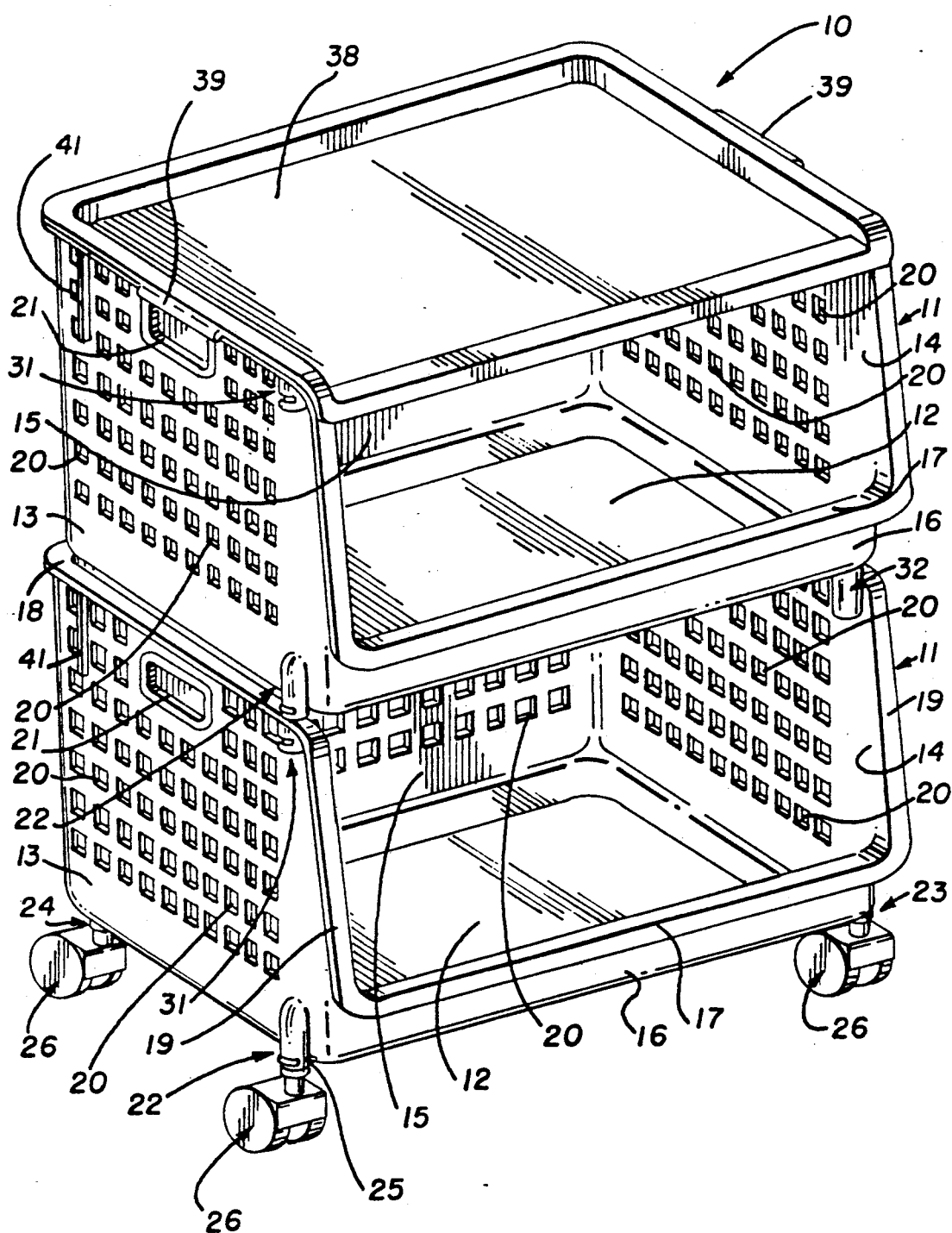
FIG. 1 is a perspective view of a bin cart system showing two storage bins according to the concepts of the present invention stacked on each other and having an optional cover tray attached to the top storage bin, and optional caster assemblies attached to the bottom storage bin.

A storage bin system is indicated generally by the numeral 10 and is shown as including two identical storage bins generally indicated by the numeral 11 While two bins 11 are shown, it should be appreciated that essentially any number of bins 11, within room height limitations, may be stacked to form the system 10, two bins 11 having been shown for convenience.

Bins 11 are preferably made of any suitable plastic material, such as polypropylene, and include a bottom surface 12 having opposed side walls 13, 14, and a rear wall 15 extending upwardly from bottom surface 12. The front of each bin 11 is generally open so that material to be stored can be readily received therein. The open front is defined by a short front wall 16 extending upwardly from bottom surface 12 and terminating only partially upwardly between side walls 13 and 14 as a front lip 17. Thus, side walls 13, 14 and rear wall 15 extend substantially higher than front wall 16 and terminate as an upper rim 18. A sloping front rim 19 extends downwardly from upper rim 18 to merge with front lip 17.

Side walls 13 and 14 and rear wall 15 can be provided with a plurality of apertures or perforations 20 which not only reduce the cost of bins 11 by saving material, but which also add a decorative feature and provide additional visual access to the contents of the bins. In addition, side walls 13 and 14 may be provided with handle openings 21 so that a bin 11 or the bin system 10 may be readily manually transported.

Side walls 13 and 14 are provided with foot members generally indicated by the numerals 22 and 23, respectively, formed on the outside near front wall 16. Rear wall 15 is formed with two foot members generally indicated by the numeral 24 (one shown) positioned on the outside thereof near side walls 13 and 14. Foot members 22, 23 and 24 are identical in construction and include a body portion 25 in the form of an inverted cup, circular in bottom plan and U-shaped in cross-section. Body portion 25 is of a diameter so as to frictionally engage conventional caster assemblies 26. Thus, if it is desired to render bin system 10 or a single bin 11 mobile, caster assemblies 26 may merely be press fit into the sockets 27 within the body portions 25 of the bottom bin 11. However, as shown, because body portions 25 of the four feet extend below bottom surface 12 of bins 11, without the caster assemblies 26, a bin 11 can be conveniently placed on the floor resting securely and directly on side feet 22, 23 and rear feet 24.

Figure 5:
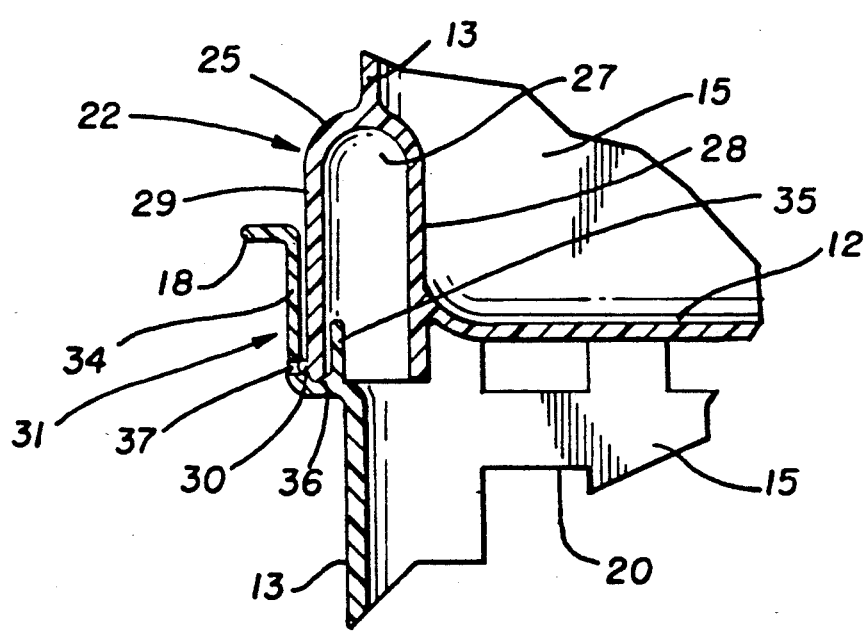
FIG. 5 is a sectional view taken substantially along line 5—5 of FIG. 2.

As probably best shown in FIG. 5, each foot body portion 25 includes an inner arcuate segment 28, or inner branch of the U-shape as seen in section, which is integrally molded to bottom surface 12, and an outer arcuate segment 29, or outer branch of the U-shape as seen in section. Outer segments 29 each have a lock tab 30 extending outwardly therefrom so as to engage the upper portion of a like bin for stacking purposes in a manner now to be described.

Figure 2:
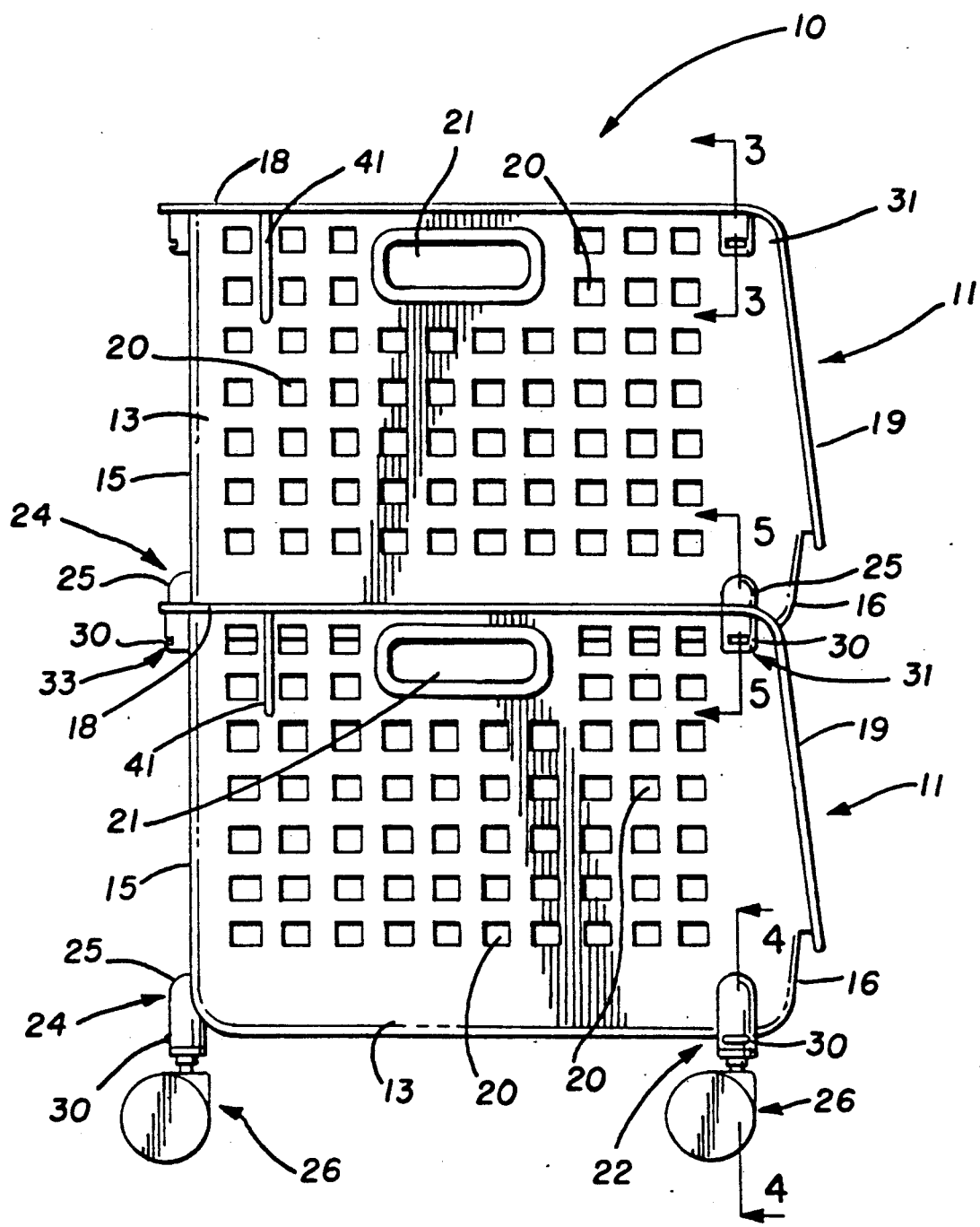
FIG. 2 is a side elevational view of the bin cart system of FIG. 1 but shown without the cover tray.

Side walls 13 and 14 are provided with upper socket members generally indicated by the numerals 31 and 32, respectively, formed on the outside thereof and opening into the inside thereof near front wall 16. Sockets 31 and 32 are positioned so as to be alignable with side foot members 22 and 23, respectively, of a like bin. Similarly, rear wall 15 is formed with two socket members generally indicated by the numeral 33 (FIG. 2) (one shown) positioned on the outside thereof and opening into the inside thereof near side walls 13 and 14. Sockets 33 are positioned so as to be alignable with rear foot members 24.

Figure 3:
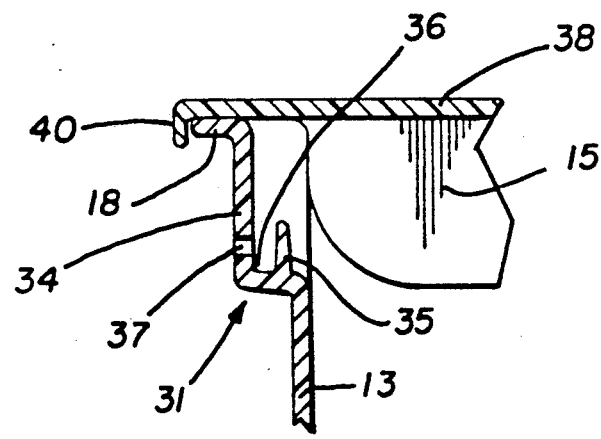
FIG. 3 is a sectional view taken substantially along line 3—3 of FIG. 2.
Figure 4:
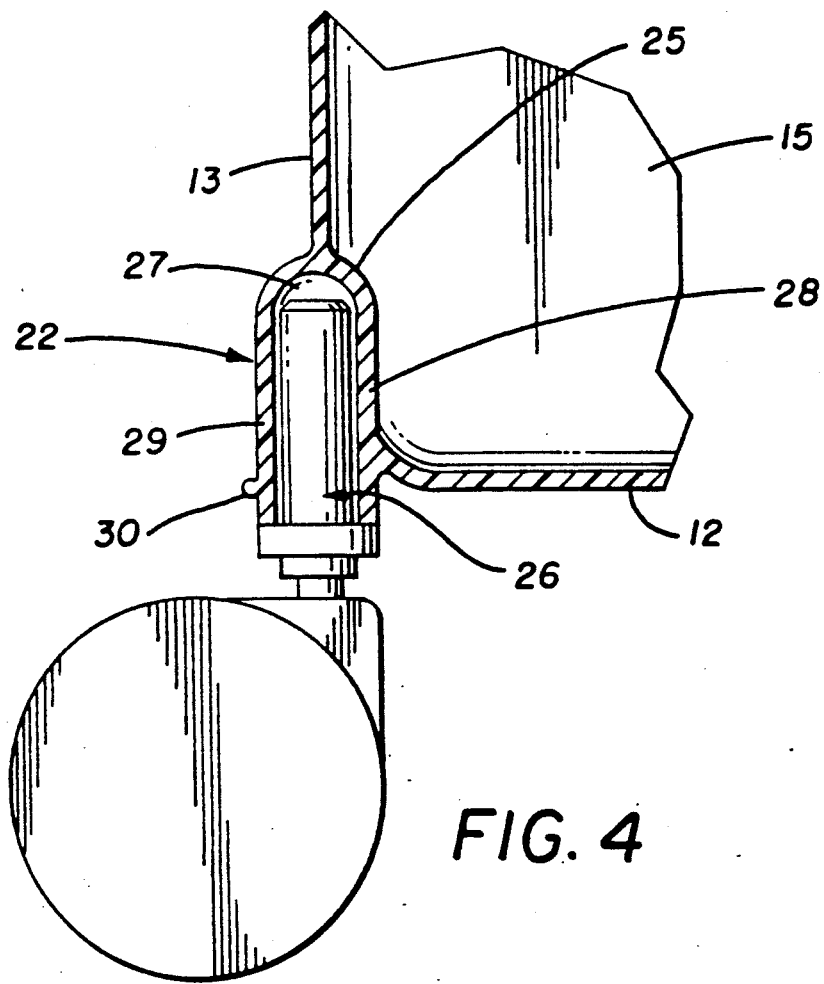
FIG. 4 is a sectional view taken substantially along line 4—4 of FIG. 2.

Sockets 31, 32 and 33 are identical in construction, the configuration of which being best shown in FIGS. 3 and 5. Sockets 31, 32 and 33 include an outer arcuate wall 34 and a shorter inner arcuate wall 35 forming a pocket 36 therebetween, pocket 36 being inwardly open within bin 11. Outer wall 34 extends downwardly from rim 18 to pocket 36 and inner wall 35 is formed integrally with and slightly outboard of side walls 13 and 14 and rear wall 15. Outer wall 34 is provided with a tab-receiving aperture 37 therethrough at the lower end thereof just above pocket 36.

As shown in FIG. 5, to effect a locked stacking of bins 11 to form system 10, outer arcuate segments 29 of body portions 25 of the feet are slid between inner and outer walls 35, 34 of the sockets 31, 32 and 33 until lock tabs 30 snap into apertures 37. Such is readily effected because as segments 29 are slid downwardly, they will be caused to flex inwardly and spring back when tabs 30 reach apertures 37. Unless the bins so stacked are unduly loaded with heavy contents, such enables one to carry bin system 10 by merely grasping handle openings 21 of the top bin 11.

As shown in FIGS. 1 and 3, bin system 10 may also include a tray/cover 38 having side handles 39 and a downturned peripheral lip 40. Tray/cover 38 is adapted to rest on upper rim 18, with lip 40 extending downwardly around the periphery thereof. As such, a horizontal surface can be formed on the top of the upper bin 11 of the system upon which articles can be placed as desired.

Figure 6:
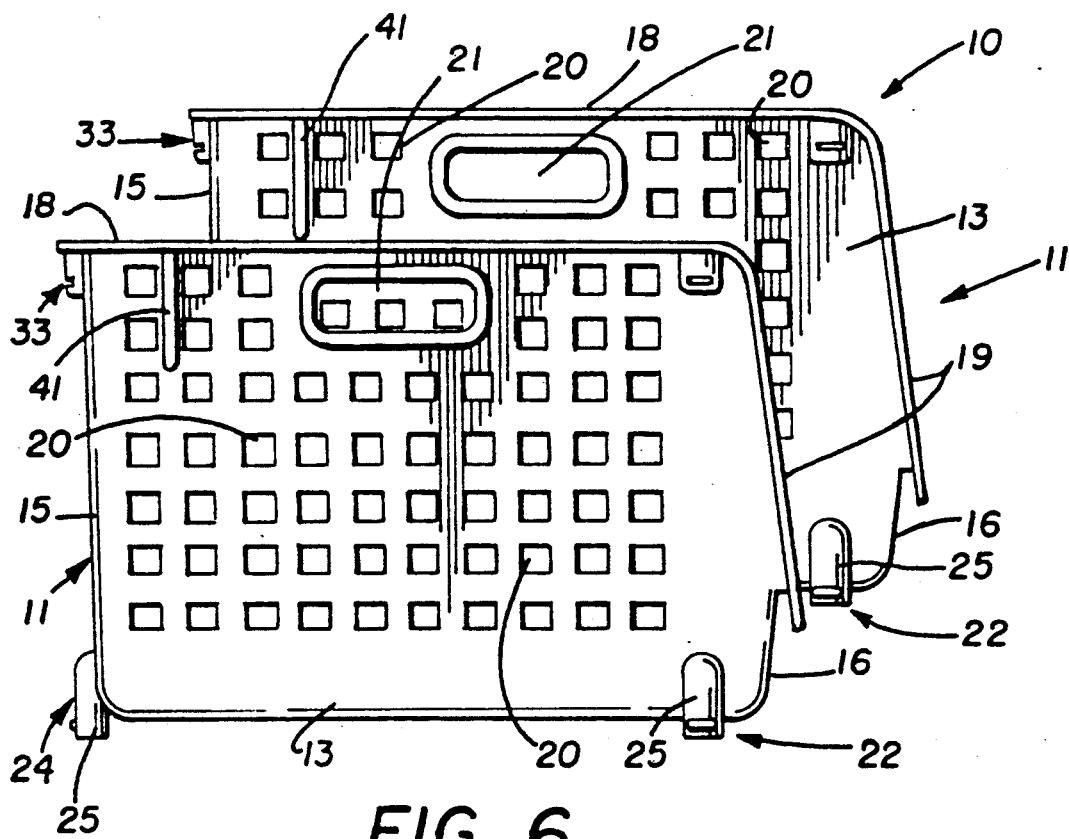
FIG. 6 is a side elevational view demonstrating the manner in which storage bins from the system may be nested within each other.

In addition to being lockably stackable, bins 11 of the system can be nested to conserve space when not in use or when being shipped by the manufacturer or displayed by the retailer as shown in FIG. 6. To that end side walls 13 and 14 are provided with external ribs 41 extending downwardly from upper rim 18 by a length approximately equal to the vertical height of front lip 17. As such, the rib 41 of the upper bin 11 will rest on the rim 18 of the bin 11 below and the bottom surface 12 of the upper bin 11 will rest on the lip 17 of the bin 11 below. The bins will thus nest in a horizontal position with the rear wall 15 of the upper bin 11 spaced from the rear wall 15 of the bin 11 below. The ability to so nest is also enhanced by the fact that side walls 13 and 14 flare outwardly as they extend upwardly at a draft angle to enable one bin 11 to be received within the other. Moreover, the fact that only two of the feet 22 and 23 are positioned on side walls 13 and 14, with the other feet 24 being positioned on the rear wall 15, facilitates the nesting because the feet 22, 23 of the upper bin 11 are outside the front opening of the bin 11 below, while the rear feet 24 of the bin 11 above are within the bin 11 below and spaced from its rear wall 15.

It should thus be evident that a bin system constructed of bins in accordance with the concepts of the present invention accomplishes the objects of the invention and substantially improves the art.

We claim:

1. A storage bin comprising a bottom surface, opposed side walls and a rear wall extending upwardly from said bottom surface and forming an open top defined by an upper rim, foot members formed in said side walls and said rear wall and extending below said bottom surface, sockets formed in said side walls and said rear wall near said upper rim, an aperture formed in each said socket, and means formed on said foot members so that said foot members and the sockets of a like bin may engaged each other to stack the bin on the like bin, said means including lock tabs which automatically engage each said aperture as said foot members are received in said sockets.

2. A storage bin according to claim 1, each said foot member including a U-shaped body member, said sockets including an inner wall and an outer wall, a portion of each said U-shaped body member being received between each said inner wall and outer wall of the like bin.

3. A storage bin according to claim 2, each said lock tab being carried by said portion of each said U-shaped body member and each said aperture being in said outer wall of said sockets.

4. A storage bin according to claim 1 wherein said foot members include lower sockets adapted to receive a caster assembly.

5. A storage bin according to claim 1 further comprising a generally open front defined by a front wall shorter than said side walls and said rear wall and having an upper lip thereon.

6. A storage bin according to claim 5 further comprising rib members extending downwardly from said upper rim along said side walls.

7. A storage bin according to claim 6 wherein a like bin is nestable within the bin by positioning its bottom surface on said upper lip and its rib members on said upper rim.

8. A storage bin according to claim 1 wherein there is one said foot member in each said side wall positioned on the outside thereof near the front thereof, and two said foot members in said rear wall, each being positioned on the outside thereof, one of each said foot members being positioned near each said side wall.

9. A storage bin according to claim 8 wherein there is one said socket in each said side wall positioned on the outside thereof near the front thereof, and two said sockets on said rear wall, each being positioned on the outside thereof, one of each said sockets being positioned near each said side wall.

10. A storage bin according to claim 9 further comprising a generally open front defined by a front wall shorter than said side walls and said rear wall and having an upper lip thereon.

11. A storage bin according to claim 10 wherein a like bin is nestable within the bin by positioning its foot members in said rear wall between said side walls of the bin with its foot members in said side walls being positioned outside of said open front of the bin.

12. A storage bin system comprising a plurality of storage bins being capable of being stacked one upon the other, each said bin including a bottom surface, opposed side walls and a rear-wall extending upwardly from said bottom surface to form an open top, a first socket formed on each said side wall of each said bin positioned on the outside of said side wall near the front thereof and near said open top, two second sockets on said rear wall of each said bin, each said second socket being positioned on the outside of said rear wall, one of each said second sockets being positioned near each said side wall, a first foot member complementary to said first socket formed on each said side wall of each said bin positioned on the outside of said side wall near the front thereof and near said bottom surface, and two second foot members complementary to said two second sockets formed in said rear wall of each said bin, each said second foot member being positioned on the outside of said rear wall, one of each said second foot members being positioned near each said side wall, said foot members being adapted to engage said sockets of said bin therebelow each, said socket having an aperture therein and said foot members each including a lock tab, each said lock tab of one bin being received in said aperture on the bin below.

13. A storage bin system according to claim 12 wherein said foot members include lower sockets and further comprising caster assemblies positioned in said lower sockets of the bottom said bin of the system to render the system mobile.

14. A storage bin system according to claim 13 further comprising handle apertures in said side walls so that the system may be carried.

15. A storage bin system according to claim 12 further comprising cover means to close said open top of the top said bin of the system.

16. A storage bin system according to claim 12, said foot members including a U-shaped body member., said sockets including an inner wall and an outer wall, a portion of said U-shaped body member being received between said inner wall and outer wall of said sockets of the bin below.

17. A storage bin system according to claim 12, said lock tab being carried by said portion of said U-shaped body member and said aperture being in said outer wall of said sockets.

18. A storage bin system according to claim 12, each said bin further comprising a generally open front defined by a front wall shorter than said side walls and said rear wall and having an upper lip thereon.

19. A storage bin system according to claim 18, each said bin further comprising rib members extending downwardly along said side walls from said open top.

20. A storage bin system according to claim 19 wherein said bins are nestable within each other by positioning said bottom surface of one said bin on said upper lip of a bin below and by positioning said rib members of said one said bin on said open top of said bin below.

21. A storage bin system according to claim 20 wherein said second foot members of said one bin are positioned between said side walls of said bin below when nested and said first foot members of said one bin being positioned outside of said open front of said bin below.

* * * * *